Sept. 12, 1967     A. H. VEDVIK     3,340,917
COMMINUTING MACHINE
Filed Aug. 9, 1965     2 Sheets-Sheet 2
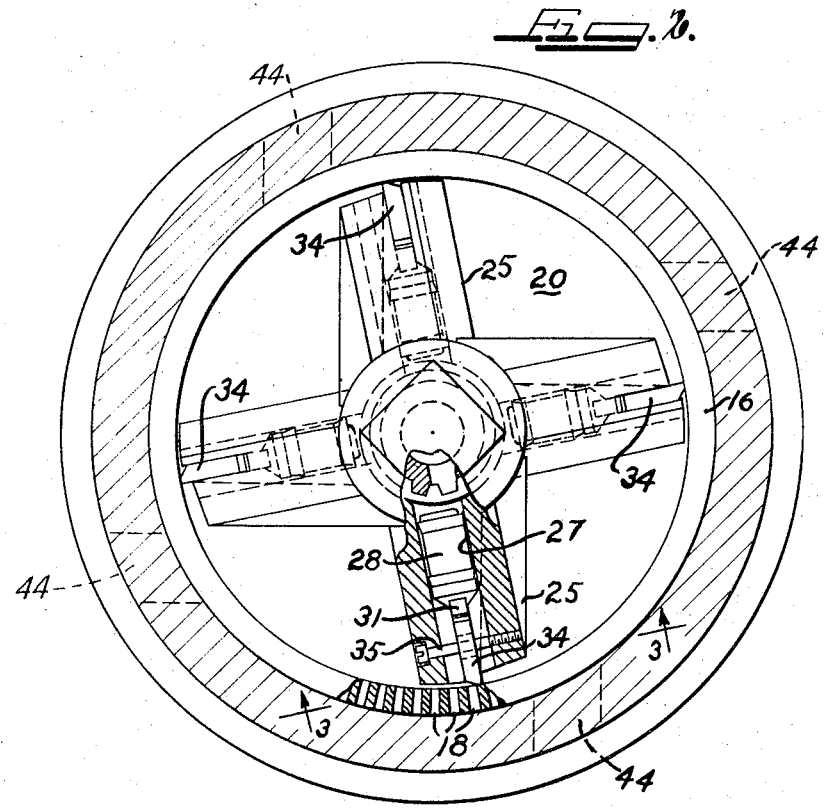
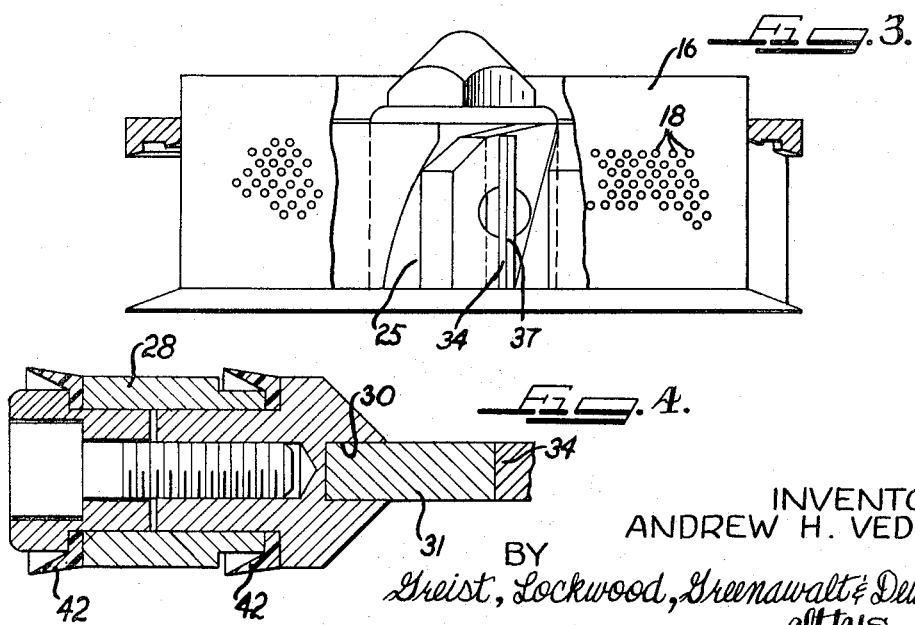
INVENTOR
ANDREW H. VEDVIK
BY
Greist, Lockwood, Greenawalt & Dewey
Attys.

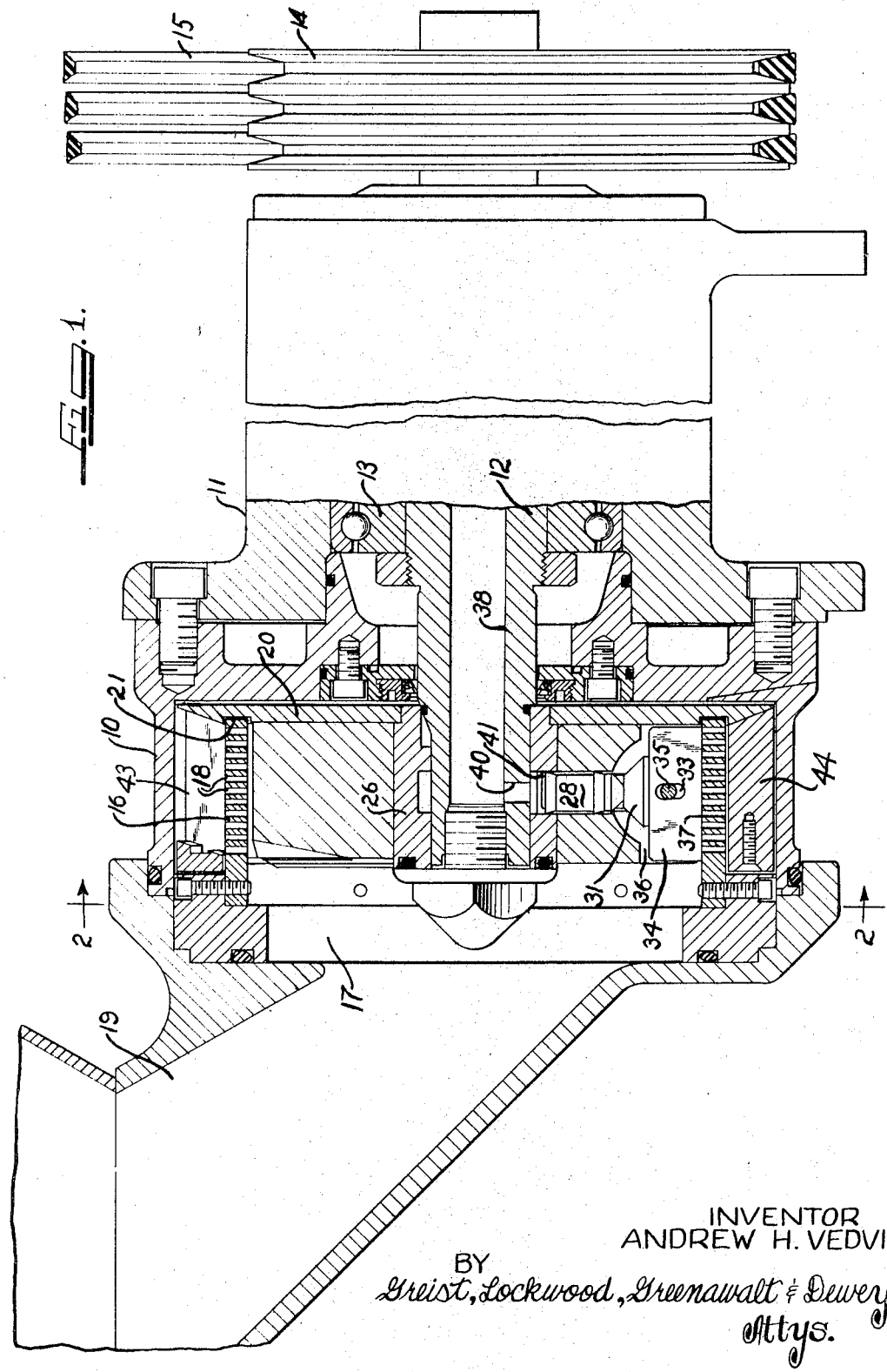

United States Patent Office 3,340,917
Patented Sept. 12, 1967

3,340,917
COMMINUTING MACHINE
Andrew H. Vedvik, Madison, Wis., assignor to Oscar Mayer & Co., Inc., Chicago, Ill., a corporation of Illinois
Filed Aug. 9, 1965, Ser. No. 478,065
10 Claims. (Cl. 146—182)

This invention relates to machines for use in producing comminuted products and is particularly concerned with improvements in a comminuting machine of the centrifugal type which is especially adapted for cutting and emulsifying meat and other comestible products.

Machines have heretofore been developed for use in comminuting many materials, especially agricultural and animal products, including meat emulsions for preparing sausage batters and the like. In one form of machine which has heretofore been used for emulsifying or reducing to a finely divided state meat emulsions and similar products a plurality of cutter blades are mounted in radial holders on a shaft which rotates at high speed within a housing having a cutting plate in the form of a cylinder which is perforated for passage of the product cut by the blades working against the inner surface thereof with centrifugal force being relied upon to hold the blades in engagement with the cutting cylinder. While this type of machine has been employed in emulsifying such materials as sausage batters, it has not been entirely satisfactory because of the inability to control or adjust the pressure exerted by the blades against the cylinder wall and it is a general object of the present invention to provide in a machine of this type an improved arrangement for mounting the cutting blades so as to enable the pressure exerted by the blade against the inner face of the cylindrical cutting plate to be adjusted and to make it unnecessary to rely upon centrifugal force for adequate cutting pressure.

It is a more specific object of the invention to provide a comminuting machine of the type in which cutting blades are mounted on a high speed shaft in a cylindrical product receiving chamber with the blades engaging the inner face of a perforated cylindrical cutting plate and in which provision is made for controlled application of pressure in a radial direction by the knife holders so as to enable the pressure exerted by the cutting blades on the cutting plate to be varied independently of the centrifugal force resulting from high speed rotation of the shaft.

It is another object of the invention to provide a comminuting machine of the type described wherein the cutting blades or knives are mounted on holders supported in radial arms on a high speed rotating shaft and the shaft is mounted in concentric relation within a perforated cylindrical cutting plate with provision for applying fluid pressure against the blade or knife holders so as to urge them into engagement with the inner face of the cutting plate.

It is still a further object of the invention to provide a comminuting machine wherein cutting blades or knives are mounted in hollow radial arms on a hollow high speed rotating shaft so as to engage the cutting edge of the blades with the inner surface of a perforated cutting cylinder and fluid pressed pistons in the hollow arms are associated with the blades for controlling the pressure on the same.

These and other objects and advantages of the invention will become apparent from a consideration of the comminuting machine which is shown by way of illustration in the accompanying drawings wherein:

FIGURE 1 is a view partially in elevation and partially in section illustrating a comminuting machine which embodies the principles of the invention;

FIGURE 2 is a cross section taken on the line 2—2 of FIGURE 1, with portions broken away;

FIGURE 3 is a view taken generally on the line 3—3 of FIGURE 2, with portions broken away; and FIGURE 4 is a fragmentary longitudinal section through one of the blade carrying pistons.

Referring to the drawings, there is illustrated a machine which is especially useful for comminuting or emulsifying various products such as comestibles, particularly agricultural and animal products, including meats suitable for sausage batter and the like. The machine comprises an outer cylindrical housing 10 which is bolted or otherwise secured on the one end of a horizontally disposed cylindrical bearing housing 11 in which a hollow shaft 12 is journaled in axially spaced bearings, one of which is indicated at 13. The shaft 12 is extended outwardly of the housing and carries a pulley 14 which is connected by belt 15 to a motor or other power device. A cutting plate 16, in the form of a short cylindrical section, is removably mounted in fixed relation within the housing 10 by means of a removable sealing ring 17 and provided with passageway forming perforations 18 which will be of a size and spaced according to the fineness desired for the finished product. A funnel-like supply hopper 19 is secured on the open outer end of the housing 10 so as to direct the raw material into the cutting chamber formed by the cylindrical cutting plate 16 and a disc-like bottom plate 20 which is mounted on the shaft 12 and provided with a groove 21 in the outer margin thereof for accommodating the inner edge of the cylindrical plate 16. Four knife or blade holders 25 are mounted on a hub forming portion 26 secured on the end of the shaft 12 and extend in a generally radial direction from the center of the hub. The knife holders each have a radial bore 27 in which a blade supporting piston 28 is mounted for sliding movement. Each of the pistons 28 has a slot 30 in the outer end in which a cutting blade pressure distributing pad 31 is secured. The blade 34 is mounted for limited sliding movement on the blade supporting arm 25 by means of a slot 33 in the blade 34 and a shoulder screw 35 extending in the arm 25 and through the slot 33. Each blade supporting arm 25 has a slot 36 in the outer end for accommodating the blade and the pressure pad 31 which is fanned out as shown in FIGURE 1 so as to prevent rotation of the piston 28 in the bore 27 and distribute the pressure on the blade 34, with the latter having its cutting edge 37 engaging the inner surface of the perforated cutting cylinder 16. The bore 27 in each arm 25 is in comunication with the axial passageway 38 in the shaft 12, there being communicating passageways 40 and 41 provided in the end of the shaft 12 and the arm supporting hub 26. The axial passageway 38 in the shaft 12 is connected at its outer end with a compressed air line or other fluid supply in a suitable manner and a valve (not shown) or other suitable control means is provided for controlling the pressure of the air or other operating fluid in the passageways so as to enable the operator to vary the pressure exterted on the pistons 28 as desired without relying upon centrifugal force to hold the cutting edges 37 of the blades 34 against the inner surface of the cutting plate or cylinder 16.

The pistons 28 may be constructed as shown in FIGURE 4 with suitable, axially spaced seals 42 of rubber or like material to insure free sliding movement in the bores 27 and a minimum leakage of fluid. The slots 36 in arms 25 in which the knives 34 are received and the sliding connection of the blades 34 with the pressure pads 31 allow sufficient movement of the blades 34 to insure uniform engagement with the inner surface of the cylindrical plate 16. The perforations or passageways 18 through the plate 16 permit passage of the divided product into a discharge chamber 43 formed between the cylindrical housing 10 and the cutting plate 16. Ejector blade members 44 are secured on the bottom plate 20 and travel within the discharge chamber 43 so as to move the finished product in the chamber 43 to a suitable discharge opening (not shown) preferably at the bottom or side of the chamber 43 where the product may be forced out of the machine through a suitable conduit (not shown).

In using the machine, a supply of the raw product in relatively small size pieces is maintained in the funnel-like hopper 19 which falls by gravity into the cutting chamber within the cylinder 16 where it is subject to the cutting action of the rotating knives or blades 34 which cut the material and force the same through the passageways 18 with a minimum of heat generating and air entrapment. The finished product is forced out of the chamber 43 through the discharge conduit with the help of the ejector blades 44. The pressure of the blades 34 on the cylinder wall is regulated by controlling the fluid pressure and the fineness of the finished product may be varied by substituting a cutting cylinder 16 having passageways or apertures 18 of different size and spacing as desired or by varying the rotating speed of shaft 12.

While particular materials and specific details of construction are referred to in describing the form of the machine illustrated, it will be understood that other materials and equivalent structural details may be resorted to within the spirit of the invention.

I claim:

1. A machine for high speed comminuting of meat or similar products comprising a housing having mounted therein a cylindrical perforated cutting plate which separates a product receiving chamber and a product discharge chamber, a hollow rotating shaft mounted in concentric relation within the cylindrical cutting plate, hollow knife carrying radial arms mounted on the shaft, blade supporting pistons slidably mounted in said hollow arms and cutting knives engaged by said pistons with blade forming edges bearing against the inner face of the cutting plate, means forming communicating fluid passageways between the hollow shaft and the hollow knife supporting arms and fluid means for applying pressure to said pistons to hold the blade edges against the cutting plate.

2. A machine for high speed comminuting of meat or similar products comprising a housing, a cylindrical perforated cutting plate mounted in the housing so as to provide a product receiving chamber and a product discharge chamber, a shaft mounted in concentric relation within the cylindrical cutting plate, radial arms mounted on the shaft, pistons slidably mounted on said arms and engaging cutting knives which have their blade forming edges bearing against the inner face of the cutting plate, and fluid means for applying pressure to said pistons to force the blade edges toward the inner surface of the cutting plate.

3. A high speed comminuting machine for emulsifying meat or similar products comprising a cylindrical housing having mounted therein a cylindrical perforated cutting plate which is disposed in the housing so as to provide an inner product receiving chamber and an outer product discharge chamber, a hollow rotating shaft mounted in concentric relation within the cylindrical cutting plate, hollow radial arms mounted on the shaft, pistons slidably mounted in said hollow arms and knife assemblies carried on the ends of said arms with blade forming edges engaging the inner face of the cutting plate, means forming communicating fluid passageways between the hollow shaft and the hollow radial arms and means connecting said passageways with a fluid under pressure for forcing the blade edges against the cutting plate.

4. A machine for comminuting meat or similar products comprising a housing having mounted therein a cylindrical perforated cutting plate which is constructed and disposed so as to divide the space within the housing into a product cetting chamber and a product discharge chamber, a hollow rotating shaft mounted in concentric relation within the cylindrical cutting plate, a plurality of hollow knife carrying radial arms mounted on the shaft, cutting knives movably supported on said arms with blade forming edges engaging the inner face of the cutting plate, pistons slidably mounted on said arms and engaging said cutting knives, means forming communicating fluid passageways between the hollow shaft and the hollow arms and fluid means for applying pressure to said pistons to urge the blade edges against the cutting plate.

5. A machine for high speed comminuting of meat or similar products comprising a cylindrical housing, a cylindrical perforated cutting plate mounted in said housing so as to separate an inner product receiving chamber from an outer product discharge chamber, a rotating shaft mounted in concentric relation within the cylindrical cutting plate, a circular plate member on said shaft closing one end of both the inner and outer chambers, arm members extending in a generally radial direction in said shaft, knife engaging pistons slidably mounted on said arm members, cutting knives carried on said arm members with blade forming edges positioned to engage the inner face of perforated portions of the cutting plate, means forming communicating fluid passageways associated with said arm members, and means for controlling a fluid in said passageways so as to apply pressure to said pistons to urge the knife edges against the cutting plate.

6. A machine for high speed comminuting of meat or similar products comprising a cylindrical housing, a cylindrical perforated cutting plate mounted in said housing so as to divide the interior of the housing into an inner product receiving chamber and an outer product discharge chamber surrounding the same, a rotating shaft mounted in concentric relation within the cylindrical cutting plate, a circular plate member on said shaft closing one end of both the inner and outer chambers, arms extending in a generally radial direction on said shaft, pistons slidably mounted on said arms, cutting knives engaged by said pistons and having blade forming edges disposed opposite the inner face of perforated portions of the cutting plate, means forming communicating passageways associated with the pistons and the supporting arms, means for supplying a fluid under pressure through said passageways to said pistons to urge the knife edges toward the cutting plate.

7. A machine as recited in claim 6 and said discharge chamber having a discharge opening and ejector blades carried on said circular plate member and operative to force the product through said discharge opening.

8. A machine for emulsifying products which comprises a cylindrical housing, a perforated cutting plate in the form of a cylinder removably mounted in said housing so as to provide an inner product receiving and cutting chamber and an outer product discharge chamber, a rotating shaft mounted with its axis of rotation coinciding with the axis of the cylindrical cutting plate, support arms extending in a generally radial direction on the end of said shaft, a circular plate member on said shaft closing one end of both the inner and outer chambers, the other end of said inner chamber being open to receive the product to be cut, knife engaging pistons slidably mounted on said arms, cutting knives slidably supported on said arms with cutting edges engaging the inner face of perforated portions of the cylindrical cutting plate, and means for applying fluid pressure to said pistons to urge the knife edges against the inside face of the cutting plate.

9. A machine as recited in claim 8 and said outer chamber having a discharge opening and ejector arms carried on said circular plate and movable in said outer chamber to force the product into said discharge opening.

10. A machine as recited in claim 8 and said arms having end slots in which the cutting knives are slidably seated.

References Cited
UNITED STATES PATENTS 2,454,406    11/1948    Rebman _____ 241—238 X WILLIAM W. DYER, Jr., *Primary Examiner.*

JAMES M. MEISTER, *Examiner.*